US011141818B2

(12) United States Patent
Carter et al.

(10) Patent No.: US 11,141,818 B2
(45) Date of Patent: Oct. 12, 2021

(54) ROTATING DIRECT METAL LASER MELTING SYSTEMS AND METHODS OF OPERATION

(71) Applicant: General Electric Company, Schenectady, NY (US)

(72) Inventors: William Thomas Carter, Galway, NY (US); Todd Jay Rockstroh, Maineville, OH (US); Brian Scott McCarthy, Schenectady, NY (US); Subhrajit Roychowdhury, Schenectady, NY (US); Younkoo Jeong, Clifton Park, NY (US); David Charles Bogdan, Jr., Charlton, NY (US)

(73) Assignee: General Electric Company, Schenectady, NY (US)

( * ) Notice: Subject to any disclaimer, the term of this patent is extended or adjusted under 35 U.S.C. 154(b) by 572 days.

(21) Appl. No.: 15/888,727

(22) Filed: Feb. 5, 2018

(65) Prior Publication Data
US 2019/0240781 A1 Aug. 8, 2019

(51) Int. Cl.
*B33Y 30/00* (2015.01)
*B23K 26/342* (2014.01)
(Continued)

(52) U.S. Cl.
CPC ........ *B23K 26/342* (2015.10); *B23K 26/0608* (2013.01); *B23K 26/082* (2015.10);
(Continued)

(58) Field of Classification Search
CPC .............. B22F 3/1055; B23K 15/0086; B23K 26/0617; B23K 26/342; B23K 26/082;
(Continued)

(56) References Cited

U.S. PATENT DOCUMENTS

| 5,252,264 A | 10/1993 | Forderhase et al. |
| 9,126,167 B2 | 9/2015 | Ljungblad |

(Continued)

FOREIGN PATENT DOCUMENTS

| CN | 105413330 A | * | 3/2016 |
| CN | 105413330 A | | 3/2016 |

(Continued)

OTHER PUBLICATIONS

Translation of CN 105413330, Dec. 5, 2020 (Year: 2020).*
(Continued)

*Primary Examiner* — Vishal Pancholi
*Assistant Examiner* — Robert K Nichols, II
(74) *Attorney, Agent, or Firm* — Dority & Manning, P.A.

(57) ABSTRACT

A direct metal laser melting (DMLM) system includes a rotatable base, and a build plate mounted on and supported by the rotatable base, where the build plate includes a build surface. The DMLM system also includes a first actuator assembly, a first powder dispenser disposed proximate the build plate and configured to deposit a weldable powder on the build surface of the build plate. In addition, the DMLM system includes a first powder spreader disposed proximate the build plate and configured to spread the weldable powder deposited on the build surface of the build plate, and a first laser scanner supported by the first actuator assembly in a position relative to the build plate, such that at least a portion of the build surface is within a field of view of the first laser scanner. The first laser scanner is configured to selectively weld the weldable powder. The first laser scanner is further configured to translate axially relative to the build surface on the first actuator assembly.

20 Claims, 4 Drawing Sheets

(51) Int. Cl.
- *B33Y 10/00* (2015.01)
- *B23K 26/16* (2006.01)
- *B23K 26/08* (2014.01)
- *B23K 26/06* (2014.01)
- *B23K 26/144* (2014.01)
- *B23K 26/082* (2014.01)

(52) U.S. Cl.
CPC ........ *B23K 26/0823* (2013.01); *B23K 26/144* (2015.10); *B23K 26/16* (2013.01); *B33Y 10/00* (2014.12); *B33Y 30/00* (2014.12)

(58) Field of Classification Search
CPC .............. B23K 26/144; B23K 26/0608; B23K 26/0823; B23K 26/16; B29C 64/153; B33Y 10/00; B33Y 30/00
USPC ........................................................ 219/76.1
See application file for complete search history.

(56) References Cited

U.S. PATENT DOCUMENTS

| | | | |
|---|---|---|---|
| 9,321,215 B2 | 4/2016 | Dudley | |
| 9,358,729 B2 | 6/2016 | Hofacker et al. | |
| 9,527,272 B2 | 12/2016 | Steele | |
| 9,597,730 B2 | 3/2017 | Mironets et al. | |
| 10,022,794 B1 * | 7/2018 | Redding | B23K 15/002 |
| 10,073,060 B2 * | 9/2018 | Redding | B33Y 30/00 |
| 2014/0191439 A1 | 7/2014 | Davis | |
| 2015/0202687 A1 | 7/2015 | Pialot et al. | |
| 2015/0239179 A1 | 8/2015 | Goto et al. | |
| 2016/0114427 A1 | 4/2016 | Eibl et al. | |
| 2016/0129502 A1 | 5/2016 | Varetti | |
| 2016/0136759 A1 * | 5/2016 | Broda | B22F 3/1055 219/76.1 |
| 2016/0193695 A1 | 7/2016 | Haynes | |
| 2016/0288207 A1 | 10/2016 | Gambardella | |
| 2016/0368050 A1 | 12/2016 | Morris et al. | |
| 2017/0036404 A1 | 2/2017 | Rengers et al. | |
| 2017/0144874 A1 | 5/2017 | Huebinger et al. | |
| 2017/0246678 A1 | 8/2017 | Bunker et al. | |
| 2017/0246689 A1 | 8/2017 | Garry | |
| 2018/0099332 A1 | 4/2018 | Shaw | |
| 2018/0311731 A1 | 11/2018 | Spicer et al. | |
| 2019/0143406 A1 | 5/2019 | Carter et al. | |

FOREIGN PATENT DOCUMENTS

| | | |
|---|---|---|
| EP | 3031552 A2 | 6/2016 |
| EP | 3106288 A1 | 12/2016 |
| WO | 2014195068 A1 | 12/2014 |
| WO | WO2017/192033 A2 | 11/2017 |

OTHER PUBLICATIONS

International Search Report Corresponding to Application No. PCT/US2019/013930 dated Apr. 25, 2019.

Ji et al., "Fabrication of functionally graded properties by direct laser melting of compositionally selective metallic powder", 2015 15th International Conference on Control, Automation and Systems (ICCAS), pp. 1955-1957, Busan, Oct. 13-16, 2015.

Guo et al., "Design of a novel control strategy for laser-aided additive manufacturing processes", IECON 2016—42nd Annual Conference of the IEEE Industrial Electronics Society, pp. 6091-6096, Florence, Oct. 23-26, 2016.

Hauser et al., "Spiral growth manufacturing (SGM)—a continuous additive Manufacturing technology for processing metal powder by Selective laser melting", ResearchGate, pp. 1-12, Jan. 2005.

U.S. Appl. No. 15/401,643, filed Jan. 9, 2017 entitled System and Methods for Fabricating a Component With Laser Array.

U.S. Appl. No. 15/438,326, filed Feb. 21, 2017 entitled Additive Manufacturing System and Method of Forming an Object in a Powder Bed.

U.S. Appl. No. 15/408,843, filed Jan. 18, 2017 entitled Systems and Methods for Additive Manufacturing Rotating Build Platforms.

U.S. Appl. No. 15/400,592, filed Jan. 6, 2017 entitled Systems and Methods for Additive Manufacturing Recoating.

U.S. Appl. No. 15/787,189, filed Oct. 18, 2017 entitled Scan Path Generation for a Rotary Additive Manufacturing Machine.

U.S. Appl. No. 15/824,206, filed Nov. 28, 2017 entitled Scan Path Correction for Movements Associated With an Additive Manufacturing Machine.

U.S. Appl. No. 15/810,308, filed Nov. 13, 2017 entitled Additive Manufacturing Apparatus and Method for Large Components.

* cited by examiner

ROTATING DIRECT METAL LASER MELTING SYSTEMS AND METHODS OF OPERATION

BACKGROUND

The field of disclosure relates generally to additive manufacturing, and more particularly, to systems and methods for direct metal laser melting ("DMLM"), in which a weldable powder is deposited and welded on a rotating build plate to create an object, and in which a laser scanner mounted over the build plate is raised as the object is created.

Additive manufacturing systems (also known as 3D printing systems) are used to create three-dimensional objects by forming such objects from successive layers of material. Typically, additive manufacturing systems operate under computer control (such as, for example, based upon a three-dimensional computer aided design and drafting ("CAD") model of an object to be manufactured). Build materials are wide-ranging and include, for example, materials such as metals, glasses, thermoplastics, inks, various construction materials, such as concrete, and the like.

Accordingly, in the realm of additive manufacturing systems, DMLM systems are those arranged to weld successive layers of a weldable powder, such as a metal powder, to create a desired three-dimensional object. Traditional DMLM systems include a build plate over which a metal powder is deposited. The powder is heated to melting by a laser, such as a high-energy fiber laser, under the control of a computer. The melted powder cools and solidifies to form one layer of the object, the build plate is lowered, and the process repeats.

Drawbacks associated with conventional DMLM systems include sequential powder deposition and welding phases, resulting, for example, in periods of time during which welding operations are not performed (e.g., system latencies). Other drawbacks include utilization of excess quantities of metal powder, object size constraints, and relatively slow build rates.

A DMLM system capable of simultaneous powder deposition and welding operations is therefore desirable. More particularly, a rotating DMLM system capable of simultaneous powder deposition and welding operations is desirable. A rotating DMLM system in which a laser scanner mounted over a build plate is raised (rather than lowered or held stationary) is also desirable.

BRIEF DESCRIPTION

In one aspect, a direct metal laser melting (DMLM) system is provided. The DMLM system includes a rotatable base, and a build plate mounted on and supported by the rotatable base, where the build plate includes a build surface. The DMLM system also includes a first actuator assembly, a first powder dispenser disposed proximate the build plate and configured to deposit a weldable powder on the build surface of the build plate. In addition, the DMLM system includes a first powder spreader disposed proximate the build plate and configured to spread the weldable powder deposited on the build surface of the build plate, and a first laser scanner supported by the first actuator assembly in a position relative to the build plate, such that at least a portion of the build surface is within a field of view of the first laser scanner. The first laser scanner is configured to selectively weld the weldable powder. The first laser scanner is further configured to translate axially relative to the build surface on the first actuator assembly.

In another aspect, a DMLM system is provided. The DMLM system includes a rotatable base configured to rotate about a centerline, and a build plate mounted on and supported by the rotatable base, where the build plate includes a build surface, and the rotatable base is configured to rotate the build plate. The DMLM system also includes a powder dispenser configured to deposit a weldable powder on the build surface during rotation of the build plate, a first actuator assembly, and a first laser scanner supported by the first actuator assembly in a position relative to the build plate, such that at least a portion of the build surface is within a field of view of the first laser scanner. The first laser scanner is configured to construct an object from the weldable powder deposited on the build surface during rotation of the build plate. The first laser scanner is also configured to translate on the first actuator assembly parallel to the centerline during rotation of the build plate.

In yet another aspect, a method of manufacturing an object using a DMLM system is provided. The method includes depositing a first layer of metal powder on a build surface of a rotating build plate, welding, by a laser scanner, the first layer of metal powder on the build surface of the rotating build plate, and raising, during the depositing and welding, the laser scanner a predefined distance relative to the build surface. The method also includes depositing a second layer of metal powder on the build surface of the rotating build plate, and welding, by the laser scanner, the second layer of metal powder on the build surface of the rotating build plate.

DRAWINGS

These and other features, aspects, and advantages of the present disclosure will become better understood when the following detailed description is read with reference to the accompanying drawings in which like characters represent like parts throughout the drawings, wherein.

Figure 1:
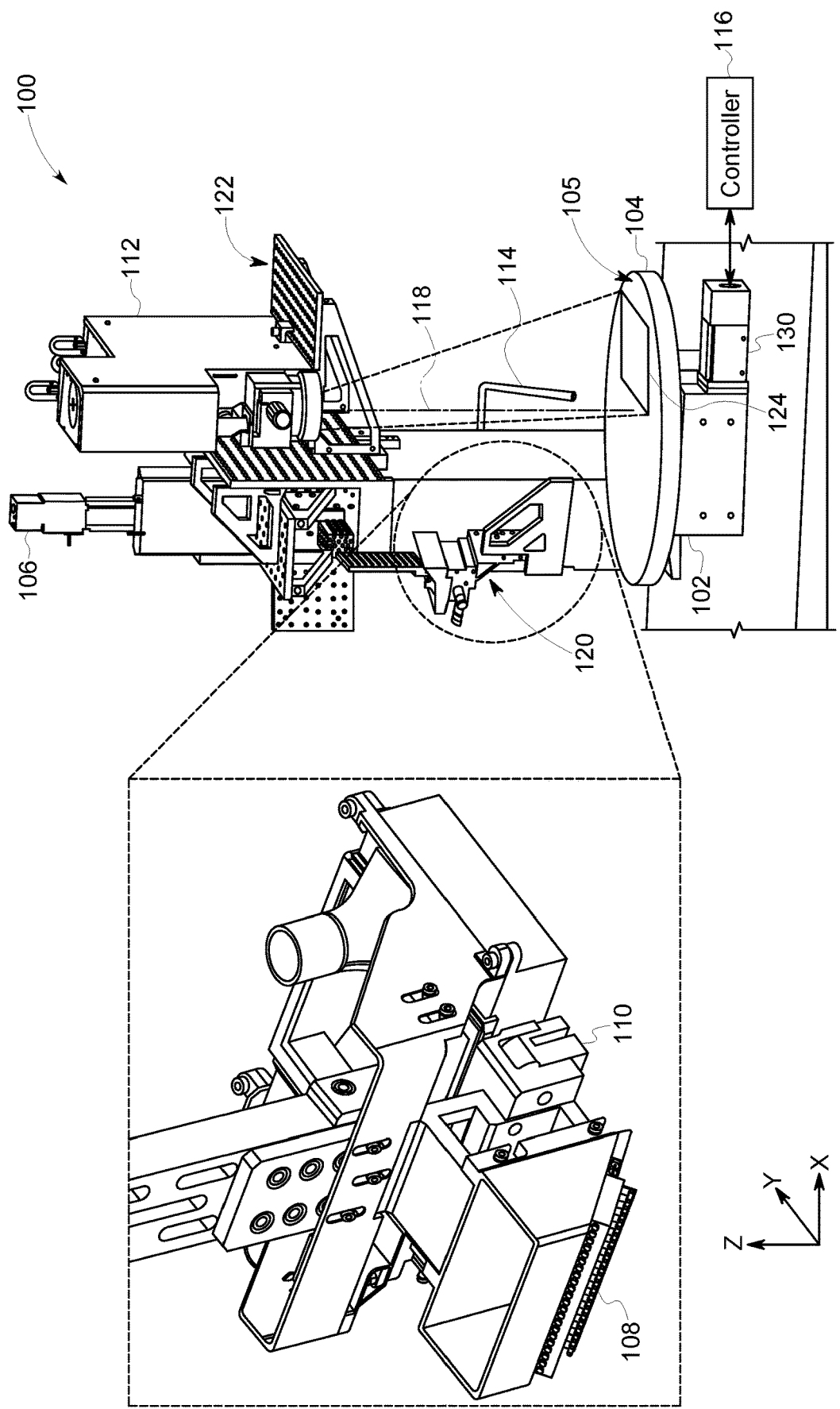
FIG. 1 is a perspective view of an exemplary direct metal laser melting ("DMLM") system that includes a single laser scanner.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, spatially relative terms, such as "beneath," "below," "under," "lower," "higher," "above," "over," and the like, may be used to describe one element or feature's relationship to one or more other elements or features as illustrated in the figures. It will be understood that such spatially relative terms are intended to encompass different orientations of the elements and features described herein both in operation as well as in addition to the orientations depicted in the figures. For example, if an element or feature in the figures is turned over, elements described as being "below" one or more other elements or features may be regarded as being "above" those elements or features. Thus, exemplary terms such as "below," "under," or "beneath" may encompass both an orientation of above and below, depending, for example, upon a relative orientation between such elements or features and one or more other elements or features.

As used herein, a "weldable powder" is any commercially available powder capable of and/or designed for use with a laser welding system. For example, a weldable powder may include a weldable (e.g., meltable and/or sinterable) metal powder. However, in other embodiments, a weldable powder may include a polymer or thermoplastic powder, a glass powder, and/or any other suitable weldable powder.

As used herein, the term "proximate" may be used to refer to a spatial relationship between two or more components. Specifically, as used herein, a powder dispenser may be considered to be "proximate" a build plate if the powder dispenser is positioned relative to the build plate, such that the powder dispenser is capable of depositing a weldable powder on the build plate. Similarly, a powder spreader may be considered to be "proximate" the build plate if the powder spreader is positioned relative to the build plate, such that the powder spreader is capable of spreading the weldable powder on the build plate (e.g., after it has been deposited by the powder dispenser).

Although the additive manufacturing techniques described herein are generally described in relation to direct metal laser melting (DMLM) systems, it will be appreciated that various other additive manufacturing techniques are contemplated and within the scope of this disclosure. For example, additive manufacturing techniques suitable for implementation with the subject matter described herein may include, but are not limited to, vat photopolymerization, powder bed fusion, binder jetting, material jetting, sheet lamination, material extrusion, directed energy deposition, and the like.

Other additive manufacturing systems which may be suitable for implementation in conjunction with the present disclosure include SLA—Stereolithography Apparatus, DLP—Digital Light Processing, 3 SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS Laser Engineered Net Shaping, DMD—Direct Metal Deposition, Hybrid Systems, and combinations of these processes and systems. In some cases, the additive manufacturing techniques listed above may employ, for example, and without limitation, any suitable form of electromagnetic radiation, heating, sintering, melting, curing, binding, consolidating, pressing, embedding, and/or combinations thereof.

Embodiments of the present disclosure relate to a rotating DMLM system that facilitates construction of an object on a rotating build plate, such as, for example, by at least one translating laser scanner mounted over and above the rotating build plate. More particularly, a powder dispenser disposed over the build plate deposits a layer of weldable powder, such as a layer of weldable metal powder, on a build surface thereof, and a powder spreader follows behind the powder dispenser to smooth the layer of weldable powder down to a desired thickness. As the build plate continues to rotate, portions of the powder covered build plate come into a field of view of the laser scanner, and the laser scanner welds the powder on the build plate to construct a layer of the object. Powder deposition and welding operations are performed concurrently, such that, over time, the object is built up, layer by layer, until it is completed. In addition, build times are improved by concurrent powder deposition and welding operations.

FIG. 1 is a perspective view of an exemplary direct metal laser melting ("DMLM") system 100. In general, system 100 includes a rotatable base 102, a build plate 104, a first actuator assembly 106, a first powder dispenser 108, a first powder spreader (or "recoater") 110, a first laser scanner 112, a filtration device 114, and a controller 116.

Rotatable base 102 is any structure capable of supporting build plate 104 and rotation about a centerline 118. A motor 130, such as an electric motor, may be mechanically coupled to rotatable base 102 and may be arranged to engage with rotatable base 102 to cause rotatable base 102 to rotate. Rotatable base 102 may include a variety of other components; however, these components are not central to an understanding of the present disclosure and are not described in detail herein. Those of skill will appreciate that a variety of rotatable bases (e.g., turntables) suitable for implementation as rotatable base 102 are available and may be variously implemented in accordance with the present disclosure.

Build plate 104 is any structure on which a weldable powder can be deposited and welded. As such, build plate 104 includes a build surface 105 that is arranged to receive the weldable powder and that is capable of withstanding temperatures produced during welding. The dimensions of build plate 104 may vary, depending, for example, upon the dimensions of an object to be constructed. For example, in some embodiments, build plate 104 may be annular or ring-shaped to accommodate the construction of an annular, or ring-shaped, object. In other embodiments, build plate 104 is disc shaped. Further, in the exemplary embodiment, build plate 104 is mounted on and supported by rotatable base 102 and is arranged to rotate on, and with, rotatable base 102.

First actuator assembly 106 is any actuator assembly, such as any suitable linear actuator assembly, capable of translating a component mechanically coupled thereto, such as first laser scanner 112, parallel to the z-axis, as indicated at FIG. 1. In some embodiments, first actuator assembly 106 may also be capable of translating a component coupled thereto, such as first laser scanner 112, parallel to the x-axis and/or the y-axis. In other words, first actuator assembly 106 is any actuator assembly capable of translating a component coupled thereto axially (e.g., parallel to the z-axis) relative to build plate 104. In some embodiments, first actuator assembly 106 is also capable of translating a component coupled thereto radially (e.g., orthogonally to the z-axis) relative to build plate 104. Thus, in the exemplary embodiment, first actuator assembly 106 is capable of at least two degrees, and in some cases three degrees, of linear motion.

First powder dispenser 108 is any component, such as a hopper and/or funnel, capable of dispensing a weldable powder. Specifically, first powder dispenser 108 is any dispensing component capable of dispensing or depositing a weldable powder on build surface 105 of build plate 104. To this end, first powder dispenser 108 is disposed proximate, and some distance above (as described herein), build plate 104, and is configured to deposit a weldable powder on build surface 105. First powder dispenser 108 may be of a variety of types, such as, for example, a vibratory type or an auger type, in which powder is fed from a hopper and onto build plate 104 at a controlled rate.

First powder spreader 110 is an elongated member shaped to spread and level a weldable powder deposited (e.g., by first powder dispenser 108) on build surface 105. In some embodiments, first powder spreader 110 is mechanically coupled to and/or disposed in proximity to first powder dispenser 108, such that first powder spreader 110 is able to spread and level powder dispensed by first powder dispenser 108. For example, first powder spreader 110 may be disposed relative to first powder dispenser 108, such that, as build plate 104 rotates, a layer of powder deposited on build plate 104 by first powder dispenser 108 is subsequently leveled and reduced to a predefined thickness or depth by first powder spreader 110.

More particularly, and in some embodiments, first powder spreader 110 is disposed proximate to, and some distance above, build plate 104, such that first powder spreader 110 is able to spread powder dispensed from first powder dispenser 108 on build surface 105. In some embodiments, first powder spreader 110 may be offset from build surface 105 by a predefined distance, such as a predefined distance of several microns (which corresponds to a thickness of a layer of weldable powder). Thus, first powder spreader 110 and first powder dispenser 108 cooperate to dispense and spread a weldable powder on build surface 105 of build plate 104.

First laser scanner 112 is any laser scanner, such as any commercially available laser scanner, capable of welding (or melting) a weldable powder, as described herein. In the exemplary embodiment, first laser scanner 112 is a freely addressable laser scanner, such as a laser scanner that includes one or more servo-controlled galvanometers. However, in other embodiments, first laser scanner 112 is a resonant galvanometer laser scanner. Thus, first laser scanner 112 is capable of either and/or both of raster scanning and/or vector scanning operations.

Filtration device 114 is any suitable air or gas filtration device arranged to filter smoke or another gas byproduct produced during welding from an enclosure or chamber (not shown) that encloses and/or surrounds system 100. Filtration device 114 is therefore disposed proximate build surface 105 of build plate 104, such that, during welding operations, smoke produced during welding is drawn into filtration device 114 and removed from the enclosure. In the example shown, filtration device 114 includes a suction hose and is disposed, as described above, proximate build surface 105. In some embodiments, filtration device 114 may also include a blower (not shown), which may be disposed in relative proximity to the suction hose (e.g., within 6 inches) and which may function to blow filtered and/or purified gas into the enclosure surrounding system 100.

In general, controller 116 coordinates welding operations performed by system 100. To this end, and in some embodiments, controller 116 includes one or more computer processors communicatively coupled to one or more tangible, non-transitory, computer-readable, memory devices. In some embodiments, controller 116 retrieves a three-dimensional computer-aided design and drafting ("CAD") model from a computer-readable memory device and coordinates the motion and/or operations of one or more components of system 100 to manufacture an object, such as an object corresponding to and/or defined by the CAD model, on build plate 104. For example, as described herein, controller 116 may coordinate the motion, position, orientation, and/or operations of rotatable base 102, build plate 104, first actuator assembly 106, first powder dispenser 108, first powder spreader 110, first laser scanner 112, and/or filtration device 114.

In the exemplary embodiment, one or more of the components described above may be mechanically coupled to, mounted on, and/or supported by first actuator assembly 106. For example, first powder dispenser 108, first powder spreader 110, and/or first laser scanner 112 may be mechanically coupled to first actuator assembly 106, such that each of these components can be translated, by first actuator assembly 106, parallel to at least one of the x, y, and/or z axes.

More particularly, first powder dispenser 108 and first powder spreader 110 are mechanically coupled to first actuator assembly 106 at a first location 120, and first laser scanner 112 is mechanically coupled to first actuator assembly 106 at a second location 122. In some embodiments, second location 122 is a platform or pedestal capable of supporting first laser scanner 112.

In addition, first laser scanner 112 is raised or mounted over build plate 104, such that first laser scanner 112 looks down on build surface 105 of build plate 104. A "field of view" 124 corresponding to an area that first laser scanner 112 is capable of lasing or welding is defined on build surface 105. For example, first laser scanner may lase or weld any location within field of view 124. Moreover, as build plate 104 rotates under laser scanner 112, consecutive portions or sectors of build surface 105 may enter (and exit) field of view 124, such that the entirety of build surface 105 rotates into and out of field of view 124 with each revolution of build plate 104.

Figure 2:
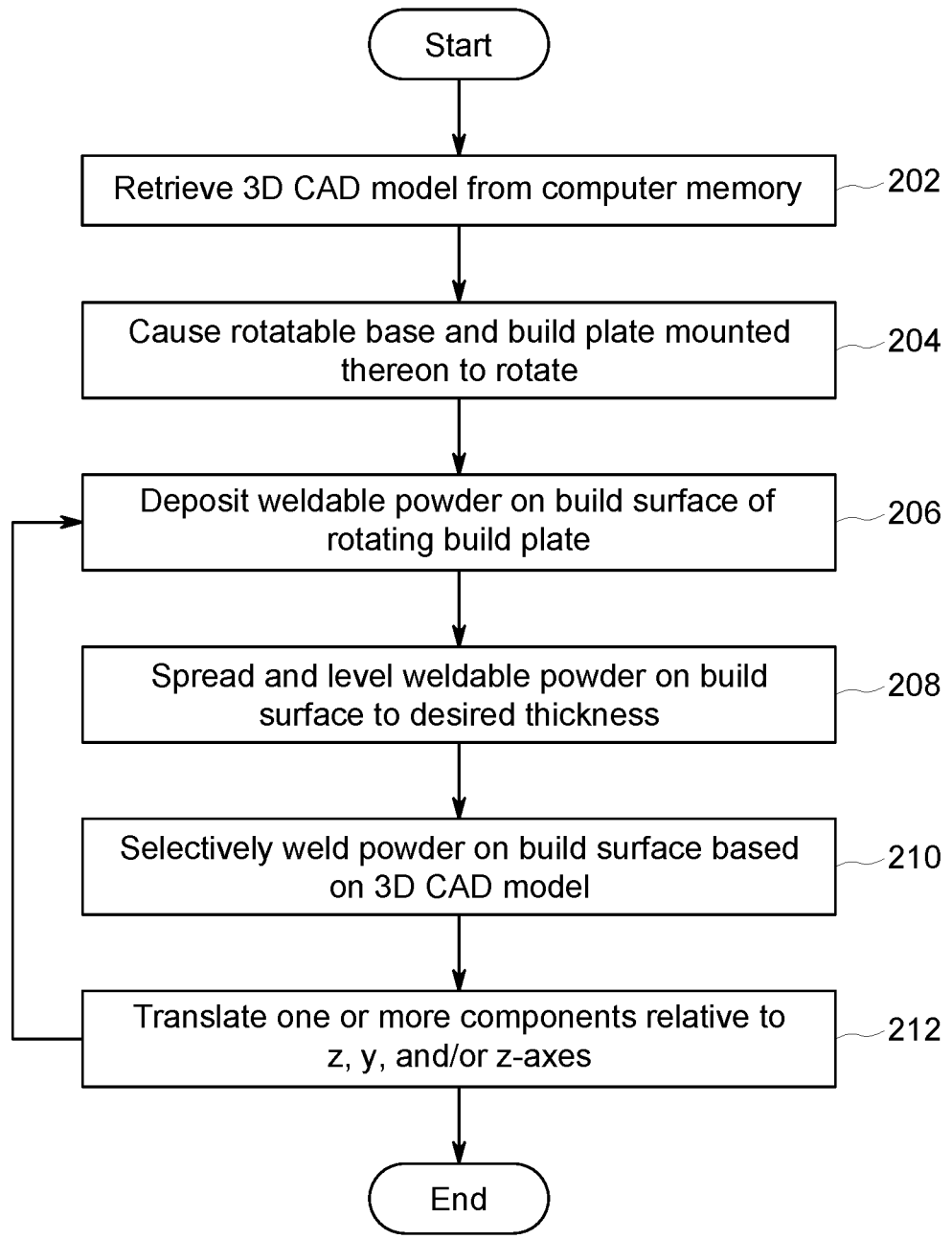
FIG. 2 is a flowchart illustrating an exemplary process of manufacturing an object using the DMLM system shown in FIG. 1.

FIG. 2 is a flowchart illustrating an exemplary process 200 of manufacturing an object using system 100 (shown in FIG. 1). Accordingly, to begin construction of an object, a three-dimensional CAD model associated with the object may, as described above, be retrieved by controller 116 from a computer memory (not shown) (step 202). Controller 116 may retrieve the CAD model and may coordinate the motion, position, orientation, and/or operations of the various components of system 100 to construct the object.

For example, in one embodiment, controller 116 may provide a control signal to rotatable base 102 that causes rotatable base 102 to rotate (step 204). The rate of rotation may be specified and/or adjusted by controller 116 and may depend on a number of laser scanners available to construct the object. As rotatable base 102 rotates, build plate 104 also rotates (e.g., as described above).

Accordingly, during rotation of build plate 104, first powder dispenser 108 deposits a weldable powder on build surface 105 of rotating build plate 104 (step 206). For example, as build plate 104 rotates under first powder dispenser 108, first powder dispenser 108 may deposit weldable powder in consecutive, evenly spaced, heaps over build surface 105 of rotating build plate 104.

As weldable powder is deposited on build surface 105, first powder spreader 110 spreads and levels the powder on build surface 105 to a desired thickness (step 208). For example, in some embodiments, first powder spreader 110 may spread the weldable powder on build surface 105 to a thickness of several microns. In other words, build plate 104 may rotate under first powder spreader 110 at a distance of several microns, such that weldable powder deposited on build surface 105 is reduced and leveled to a thickness corresponding to the distance between build surface 105 and first powder spreader 110. Typical powder thicknesses range from 10 to 100 microns, though exceptions may exist at the low and high scales.

As described above, laser scanner 112 is supported on first actuator assembly 106, such that laser scanner 112 looks down on build surface 105, and a portion of build surface 105 is always in field of view 124 of laser scanner 112 as build plate 104 rotates. Specifically, laser scanner 112 is supported on first actuator assembly 106, such that laser scanner 112 is capable of translating parallel to the z, y, and/or z axes relative to build plate 104, and such that laser scanner 112 looks down on build surface 105 and is capable of linear motion with respect thereto.

Accordingly, as portions of a rotating, powder covered, build surface 105 come into field of view 124, laser scanner 112 selectively welds the powder based on the three-dimensional CAD model retrieved from memory (step 210). Specifically, controller 116 controls laser scanner 112 to selectively weld a layer, such as a first layer, of the object associated with the CAD model on build surface 105. With each complete revolution of build plate 104, a layer of the object several microns thick (e.g., a layer as thick or substantially as thick as the layer of weldable powder deposited on build surface 105) is welded or constructed.

This process continues, layer after layer, until the complete object is manufactured on build plate 104. As layers are deposited, first actuator assembly 106 may translate one or more components, such as first powder dispenser 108, first powder spreader 110, and/or first laser scanner 112, parallel to the x, y, and/or z-axes (step 212). For example, controller 116 may provide a control signal to first actuator assembly 106 on completion of a layer of the object that causes first actuator assembly 106 to translate a distance parallel to the z-axis. In some embodiments, this distance is the thickness (e.g., several microns) of the completed layer. In other embodiments, first actuator assembly 106 may not translate on completion of a layer; rather first actuator assembly 106 may translate continuously as a layer of weldable powder is deposited and welded. For example, first actuator assembly 106 may translate monotonically as powder is deposited and/or continuously and at a variable rate of ascent. Thus, as the object grows on build plate 104, first powder dispenser 108, first powder spreader 110, and first laser scanner 112 translate, such as continuously and/or in increments of several microns, axially relative to (e.g., away from) build plate 104.

In addition, controller 116 may provide a control signal to first actuator assembly 106 that causes first actuator assembly 106 to translate parallel to the x-axis and/or the y-axis on completion of a layer and/or during welding of a particular layer. For example, controller 116 may cause first actuator assembly 106 to translate first powder dispenser 108, first powder spreader 110, and/or first laser scanner 112 radially (e.g., parallel to the x-axis and/or y-axis) to accommodate the construction of an object that includes radially inner structure and/or radially outer structure. In various embodiments, first actuator assembly 106 may translate in increments, monotonically, and/or continuously at a variable rate of speed relative to the x and y-axes.

Accordingly, in at least some embodiments, first actuator assembly 106 (and consequently first laser scanner 112) is at a fixed radial position (e.g., a fixed position relative to the x and y axes) but is allowed to translate axially relative to the z-axis. Similarly, in some embodiments, first laser scanner 112 may remain fixed radially during construction of an object by may be adjusted in the directions of the x, y, and/or z axes between process runs, such as, for example, to provide access to the completed object for removal. Further, in at least some embodiments, field of view 124 may be increased and/or decreased in size by allowing radial motion (e.g., motion parallel to the x and/or y-axes) of first laser scanner 112. In addition, those of skill will appreciate that, as a result of the mobility of first powder dispenser 108, first powder spreader 110, and first laser scanner 112 on the x, y, and z-axes, system 100 is capable of manufacturing axisymmetric objects as well as non-axisymmetric objects. For example, system 100 may create objects that are symmetric about one or more axes (e.g., axisymmetric objects) as well as objects that are not symmetric about one or more axes (e.g., non-axisymmetric objects).

Accordingly, in the exemplary embodiment, powder deposition, powder smoothing, and powder welding operations occur concurrently, such that first laser scanner 112 is not halted or otherwise latent during powder deposition and smoothing operations. Rather, all of these operations can be performed simultaneously in the rotating DMLM system 100 described above. One advantage of simultaneous powder deposition, powder smoothing, and powder welding operations is that system latencies are substantially reduced, and objects scheduled for manufacture on system 100 completed in shorter timespans (e.g., as compared to many prior art stationary Cartesian DMLM systems). In addition, a larger number of objects may be manufactured in a same time period (again, as compared to many known stationary Cartesian DMLM systems).

Figure 3:
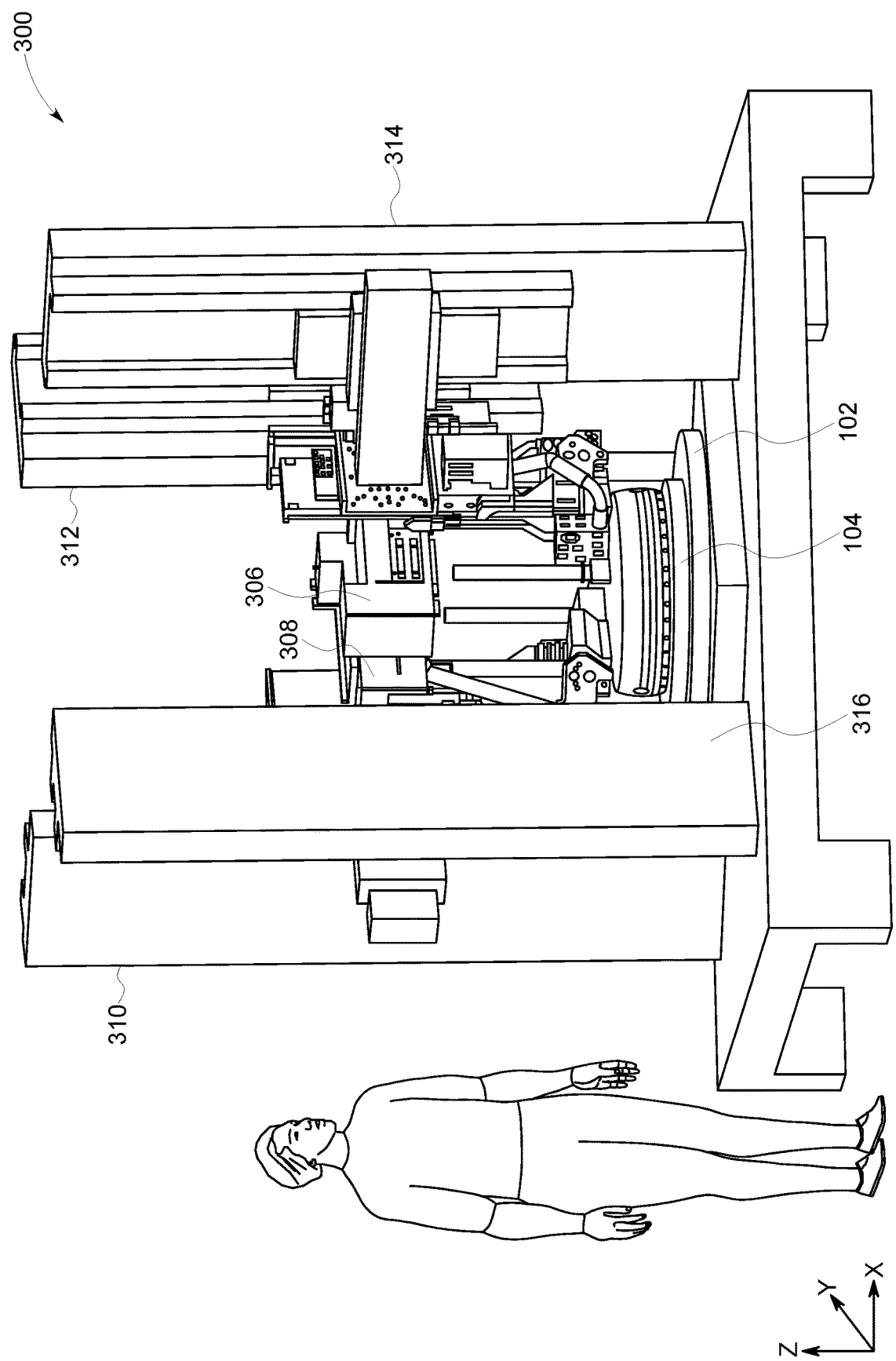
FIG. 3 is a perspective view of an exemplary DMLM system that includes four laser scanners.
Figure 4:
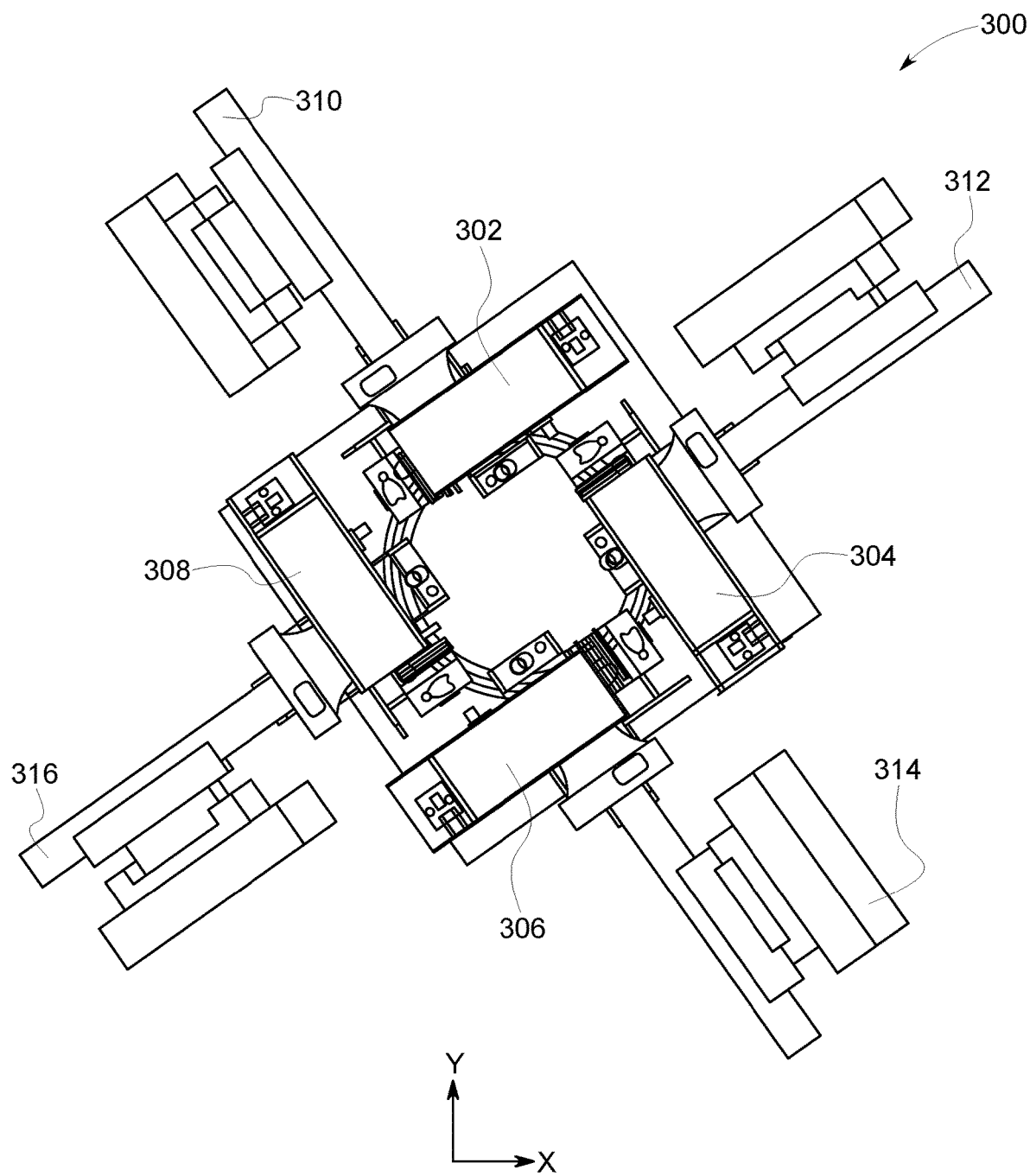
FIG. 4 is a top view of the DMLM system shown in FIG. 3.

FIG. 3 is a perspective view of an exemplary DMLM system 300 that includes four laser scanners. FIG. 4 is a top view of system 300. As shown, system 300 includes a first laser scanner 302, a second laser scanner 304, a third laser scanner 306, and a fourth laser scanner 308. Each of these laser scanners 302-308 is identical to first laser scanner 112, described above. More generally, although system 300 includes four laser scanners 302-308, it will be appreciated that any suitable number of laser scanners (e.g., two laser scanners, eight laser scanners, etc.) may be implemented as part of a rotating DMLM system, as described herein. In some embodiments, greater than eight laser scanners may be implemented.

Each of the four laser scanners 302-308 is mounted on an independent actuator assembly, such as a first actuator assembly 310, a second actuator assembly 312, a third actuator assembly 314, and a fourth actuator assembly 316, respectively. In some embodiments, each of the four laser scanners 302-308 is associated with a respective, independent, powder dispenser (not shown) and/or powder spreader (not shown). However, in other embodiments, a single powder dispenser 108 and powder spreader 110 may service all four laser scanners 302-308. In addition, in some embodiments, a first pair of laser scanners, such as first laser scanner 302 and second laser scanner 304, may operate in conjunction with first powder dispenser 108 and first powder spreader 110, while a second pair of laser scanners, such as third laser scanner 306 and fourth laser scanner 308, may operate in conjunction with a second powder dispenser (not shown) and a second powder spreader (not shown).

In each of the foregoing embodiments, system 300 operates in substantially the same manner as system 100. For example, build plate 104 is the same as in system 100 and rotates as described above with respect to system 100. In addition, each laser scanner 302-308 is arranged to translate parallel to at least one of the x, y, and/or z-axes during operation. Likewise, each powder dispenser and powder spreader pair is also arranged to translate parallel to one or more of the x, y, and z-axes. Notwithstanding, in at least some embodiments, two fixed laser scanners having overlapping fields of view may be substituted for a single translating laser scanner (e.g., any of laser scanners 302-308). Thus, system 300 operates as described above, except that an object slated for manufacture may be constructed in an even shorter time period than with a single laser scanner system (e.g., system 100).

Embodiments of the rotating DMLM system, as described above, facilitate construction of an object on a rotating build plate, such as, for example, by at least one translating laser scanner mounted over and above the rotating build plate. More particularly, a powder dispenser disposed over the build plate deposits a layer of weldable powder on a build surface thereof, and a powder spreader follows behind the powder dispenser to smooth the layer of weldable powder down to a desired thickness. As the build plate continues to rotate, portions of the powder covered build plate come into a field of view of the laser scanner, and the laser scanner welds the powder on the build plate to construct a layer of the object. Powder deposition and welding operations are performed concurrently, such that, over time, the object is built up from the build plate, layer by layer, until it is completed.

Exemplary technical effects of the DMLM system described herein include, for example: (a) concurrent or simultaneous powder deposition and welding operations performed on rotating build plate; (b) axisymmetric and non-axisymmetric object constructions; and (c) three-axis powder dispenser, powder spreader, and/or laser scanner translation on a linear actuator assembly.

Exemplary embodiments of a DMLM system and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where additive manufacturing is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A direct metal laser melting (DMLM) system comprising:
   a rotatable base;
   a build plate mounted on and supported by said rotatable base, said build plate comprising a build surface;
   a first actuator assembly;
   a first powder dispenser coupled to said first actuator assembly at a first location such that said first powder dispenser is disposed proximate said build plate and configured to deposit a weldable powder on said build surface of said build plate;
   a first powder spreader disposed proximate said build plate and configured to spread the weldable powder deposited on said build surface of said build plate; and
   a first laser scanner coupled to said first actuator assembly at a second location different than said first location, said first laser scanner supported by said first actuator assembly in a position relative to said build plate, such that at least a portion of said build surface is within a field of view of said first laser scanner, said first laser scanner configured to selectively weld the weldable powder within the field of view, said first actuator assembly configured to translate said first laser scanner axially relative to said build surface.

2. The DMLM system of claim 1, wherein said rotatable base is configured to rotate said build plate while said first powder dispenser deposits the weldable powder on said build surface.

3. The DMLM system of claim 2, wherein said first laser scanner is configured to weld the weldable powder during rotation of said build plate.

4. The DMLM system of claim 1, wherein said first powder dispenser and said first powder spreader are mechanically coupled to said first actuator assembly, said first actuator assembly configured to translate said first laser powder dispenser and said first powder spreader axially relative to said build surface.

5. The DMLM system of claim 1, wherein said first actuator assembly is further configured to translate said first laser scanner radially relative to said build surface.

6. The DMLM system of claim 1, further comprising:
   a second actuator assembly; and
   a second laser scanner mechanically coupled to and supported by said second actuator assembly, said second actuator assembly configured to translate said second laser scanner axially relative to said build surface, such that at least a portion of said build surface is within a field of view of said second laser scanner.

7. The DMLM system of claim 6, further comprising a second powder dispenser and a second powder spreader, said second powder dispenser and said second powder spreader each disposed proximate said build plate, mechanically coupled to said second actuator assembly, and said second actuator assembly configured to translate axially said second powder dispenser and said second powder spreader relative to said build surface.

8. The DMLM system of claim 6, further comprising:
a third actuator assembly;
a third laser scanner mechanically coupled to and supported by said third actuator assembly, said third actuator assembly configured to translate said third laser scanner axially relative to said build surface, such that at least a portion of said build surface is within a field of view of said third laser scanner;
a fourth actuator assembly; and
a fourth laser scanner mechanically coupled to and supported by said fourth actuator assembly, said fourth actuator assembly configured to translate said fourth laser scanner axially relative to said build surface, such that at least a portion of said build surface is within a field of view of said fourth laser scanner.

9. The DMLM system of claim 1, wherein said DMLM system is capable of manufacturing axisymmetric and non-axisymmetric objects.

10. The DMLM system of claim 1, further comprising a filtration device disposed proximate said build surface, said filtration device configured to collect and filter smoke produced when said first laser scanner welds the weldable powder.

11. A direct metal laser melting (DMLM) system comprising:
a rotatable base configured to rotate about a centerline;
a build plate mounted on and supported by said rotatable base, said build plate comprising a build surface, said rotatable base configured to rotate said build plate;
a first actuator assembly;
a powder dispenser coupled to said first actuator assembly at a first location and configured to deposit a weldable powder on said build surface during rotation of said build plate; and
a first laser scanner coupled to said first actuator assembly at a second location different than said first location, said first laser scanner supported by said first actuator assembly in a position relative to said build plate, such that at least a portion of said build surface is within a field of view of said first laser scanner, said first laser scanner configured to construct an object from the weldable powder deposited on said build surface during rotation of said build plate first actuator assembly configured to translate said first laser scanner parallel to the centerline during rotation of said build plate.

12. The DMLM system of claim 11, wherein said first powder dispenser is mechanically coupled to said first actuator assembly, said first actuator assembly configured to translate said first powder dispenser parallel to the centerline on said first actuator assembly.

13. The DMLM system of claim 11, further comprising a first powder spreader disposed proximate said build plate and configured to spread the weldable powder deposited on said build surface of said build plate, wherein said first powder spreader is mechanically coupled to said first actuator assembly, said first actuator assembly configured to translate said first powder spreader parallel to the centerline.

14. The DMLM system of claim 11, wherein said first laser scanner is further configured to translate orthogonally to the centerline during rotation of said build plate.

15. The DMLM system of claim 11, further comprising:
a second actuator assembly; and
a second laser scanner mechanically coupled to and supported by said second actuator assembly, said second laser scanner configured to construct the object from the weldable powder deposited on said build surface during rotation of said build plate, said second actuator assembly configured to translate said second laser scanner parallel to the centerline during rotation of said build plate.

16. The DMLM system of claim 15, further comprising a second powder dispenser and a second powder spreader, said second powder dispenser and said second powder spreader each disposed proximate said build plate, mechanically coupled to said second actuator assembly, and said second actuator assembly further configured to translate said second dispenser and said second powder spreader parallel to the centerline during rotation of said build plate.

17. The DMLM system of claim 15, further comprising:
a third actuator assembly;
a third laser scanner mechanically coupled to and supported by said third actuator assembly, said third laser scanner configured to construct the object from the weldable powder deposited on said build surface during rotation of said build plate, said third actuator assembly configured to translate said third laser scanner parallel to the centerline during rotation of said build plate;
a fourth actuator assembly; and
a fourth laser scanner mechanically coupled to and supported by said fourth actuator assembly, said fourth laser scanner configured to construct the object from the weldable powder deposited on said build surface during rotation of said build plate, said fourth actuator assembly configured to translate said fourth laser scanner parallel to the centerline during rotation of said build plate.

18. The DMLM system of claim 11, wherein said DMLM system is capable of manufacturing axisymmetric and non-axisymmetric objects.

19. The DMLM system of claim 11, further comprising a filtration device disposed proximate said build surface, said filtration device configured to collect and filter smoke produced when said first laser scanner welds the weldable powder.

20. A method of manufacturing an object using a direct metal laser melting system, said method comprising:
depositing, by at least a powder dispenser, a first layer of metal powder on a build surface of a rotating build plate;
welding, by a laser scanner supported by an actuator assembly, the first layer of metal powder on the build surface of the rotating build plate; and
translating said laser scanner on said actuator assembly such that said laser scanner is raised, during the depositing and welding, a predefined distance relative to the build surface,
wherein said powder dispenser is coupled to said actuator assembly at a first location, and wherein said laser scanner is coupled to said actuator assembly at a second location different than said first location.

* * * * *